(12) United States Patent
Yamasaki (10) Patent No.: US 9,091,335 B2
(45) Date of Patent: Jul. 28, 2015

(54) ELECTRIC LINEAR MOTION ACTUATOR AND ELECTRIC BRAKE SYSTEM

(71) Applicant: Tatsuya Yamasaki, Shizuoka (JP)

(72) Inventor: Tatsuya Yamasaki, Shizuoka (JP)

(73) Assignee: NTN Corporation, Osaka (JP)

( * ) Notice: Subject to any disclaimer, the term of this patent is extended or adjusted under 35 U.S.C. 154(b) by 70 days.

(21) Appl. No.: 13/954,122

(22) Filed: Jul. 30, 2013

(65) Prior Publication Data

US 2013/0312555 A1 Nov. 28, 2013

Related U.S. Application Data

(63) Continuation of application No. 13/122,569, filed as application No. PCT/JP2009/067152 on Oct. 1, 2009, now Pat. No. 8,579,090.

(30) Foreign Application Priority Data

Oct. 7, 2008 (JP) ................................. 2008-260547

(51) Int. Cl.
*F16D 55/08* (2006.01)
*F16H 25/20* (2006.01)
(Continued)

(52) U.S. Cl.
CPC ................ *F16H 25/20* (2013.01); *F16D 65/18* (2013.01); *F16H 25/2252* (2013.01);
(Continued)

(58) Field of Classification Search
CPC ............ F16D 2125/40; F16D 2125/48; F16D 2125/50; F16D 2121/24; F16D 65/18; F16H 25/2252; F16H 25/2204

USPC ............... 188/72.1, 72.7, 72.8, 156, 158, 162
See application file for complete search history.

(56) References Cited

U.S. PATENT DOCUMENTS 3,393,574 A 7/1968 Roantree
4,366,726 A * 1/1983 Nilsson ......................... 475/163
(Continued)

FOREIGN PATENT DOCUMENTS

DE 91 05 795 8/1991
DE 198 51 670 5/2000
(Continued)

OTHER PUBLICATIONS

International Search Report issued Dec. 22, 2009 in International (PCT) Application No. PCT/JP2009/067152.

(Continued)

*Primary Examiner* — Vishal Sahni
(74) *Attorney, Agent, or Firm* — Wenderoth, Lind & Ponack, L.L.P.

(57) ABSTRACT

In an electric linear motion actuator for transmitting torque of a rotary shaft (4) to planetary rollers (7) and thus to a linearly driven output member constituted by an outer race member (5), axial movement of a carrier (6) supporting the planetary rollers (7) is restricted, and the outer race member (5) is axially slidably fitted in a radially inner surface of a cylindrical portion (1a) of a housing (1) and is rotationally fixedly coupled to an object to be driven via keys (25) The planetary rollers (7) have their radially inner surfaces rotatably supported, on respective support pins (6c) of the carrier (6), and are radially inwardly biased by radial compression ring springs (21) wound around the support pins (6c) so as to envelop the support pins. The planetary rollers (7) are thus pressed against the radially outer surface of the rotary shaft (4).

6 Claims, 6 Drawing Sheets (51) Int. Cl.
  *F16D 65/18* (2006.01)
  *F16H 25/22* (2006.01)
  *F16D 121/24* (2012.01)
  *F16D 125/40* (2012.01)
  *F16D 125/48* (2012.01)
  *F16D 125/50* (2012.01)

(52) U.S. Cl.
  CPC ........ *F16D 2121/24* (2013.01); *F16D 2125/40* (2013.01); *F16D 2125/48* (2013.01); *F16D 2125/50* (2013.01); *Y10T 74/18568* (2015.01); *Y10T 74/18664* (2015.01); *Y10T 74/19795* (2015.01)

(56) References Cited

U.S. PATENT DOCUMENTS

| | | | |
|---|---|---|---|
| 4,428,437 A | 1/1984 | Steinberg | |
| 4,521,707 A | 6/1985 | Baker | |
| 4,804,073 A | 2/1989 | Taig et al. | |
| 4,850,457 A | 7/1989 | Taig | |
| 4,865,162 A | 9/1989 | Morris et al. | |
| 5,098,359 A * | 3/1992 | Chales et al. | 475/347 |
| 5,336,137 A | 8/1994 | Kawakita | |
| 5,829,315 A | 11/1998 | Polowchak et al. | |
| 6,098,479 A | 8/2000 | Hoermansdoerfer | |
| 6,315,459 B1 | 11/2001 | Takano et al. | |
| 6,405,836 B1 | 6/2002 | Rieth et al. | |
| 6,536,561 B1 | 3/2003 | Keller | |
| 6,554,109 B1 * | 4/2003 | Olschewski et al. | 188/72.8 |
| 8,109,370 B2 | 2/2012 | Yamasaki | |
| 2004/0116218 A1 | 6/2004 | Butsch et al. | |
| 2004/0244520 A1 | 12/2004 | Cornelius et al. | |
| 2005/0160856 A1 | 7/2005 | Sugitani | |
| 2008/0159667 A1 | 7/2008 | Michioka et al. | |
| 2009/0095579 A1 * | 4/2009 | Yamasaki | 188/72.7 |
| 2010/0320043 A1 * | 12/2010 | Yamasaki et al. | 188/162 |
| 2011/0247904 A1 * | 10/2011 | Yamasaki | 188/72.1 |

FOREIGN PATENT DOCUMENTS

| | | |
|---|---|---|
| DE | 198 54 578 | 5/2000 |
| EP | 0 603 067 | 6/1994 |
| JP | 6-327190 | 11/1994 |
| JP | 2002-520545 | 7/2002 |
| JP | 2003-343620 | 12/2003 |
| JP | 2007-032717 * | 2/2007 |
| JP | 2007-037305 | 2/2007 |
| JP | 2008-039169 | 2/2008 |
| WO | 02/50453 | 6/2002 |
| WO | 2004/094870 | 11/2004 |

OTHER PUBLICATIONS

Supplementary European Search Report issued Feb. 22, 2012 in EP 09 81 9123, which is a foreign counterpart to copending U.S. Appl. No. 12/866,901 (U.S. 2011/0247904).

European Office Action issued Oct. 23, 2012 in EP 09 81 9123, which is a foreign counterpart to copending U.S. Appl. No. 12/866,901 (U.S. 2011/0247904).

* cited by examiner

ELECTRIC LINEAR MOTION ACTUATOR AND ELECTRIC BRAKE SYSTEM

This application is a continuation application of Ser. No. 13/122,569, which is the U.S. National Stage of International Application PCT/JP2009/067152, filed Oct. 1, 2009, which is hereby incorporated by reference in its entirety.

TECHNICAL FIELD

The present invention relates to an electric linear motion actuator for converting the rotary motion of an electric motor to a linear motion of a object to be driven, and an electric brake system including a member to be braked and a braking member which is adapted to be pressed against the member to be braked by the electric linear motion actuator.

BACKGROUND ART

Many electric linear motion actuators for converting the rotary motion of an electric motor to a linear motion of an object to be driven include a ball-screw mechanism or a ball-ramp mechanism as a motion converter means. Further, many of such linear motion actuators include a gear reduction mechanism such as a planetary gear speed reducer so as to obtain a large linear driving force with a small-capacity electric motor (see e.g. JP Patent Publication 6-327190A).

The ball-screw mechanism or ball-ramp mechanism used in the above-described electric linear motion actuators has the ability to increase the driving force to some extent because it includes threads having a lead angle or inclined cam surfaces. But this motion converting mechanism alone cannot sufficiently increase the driving force as required by e.g. an electric brake system. Thus, the electric linear motion actuators using this type of motion converter mechanism further include a separate speed reducer such as a planetary gear speed reducer to increase the driving force. But the addition of such a separate speed reducer increases the size of the entire electric linear motion actuator.

The inventors of this application proposed an electric linear motion actuator which is free of this problem, which can sufficiently increase the driving force without mounting a separate speed reducer, and which can be used in an electric brake system, of which the linear motion stroke is relatively short. This actuator comprises a rotary shaft to which the rotation of a rotor shaft of an electric motor is configured to be transmitted, a housing having a radially inner surface, an outer race member fitted in the radially inner surface of the housing and provided around the rotary shaft, a carrier, and a plurality of planetary rollers disposed between the outer race member and the rotary shaft and rotatably supported by the carrier, wherein the planetary rollers are configured to revolve around the rotary shaft while rotating about axes of the respective planetary rollers when the rotary shaft rotates, wherein a helical rib is formed on the radially outer surface of the rotary shaft or on the radially inner surface of the outer race member, and wherein each of the planetary rollers has, on a radially outer surface thereof, a plurality of circumferential grooves which are arranged at the same pitch as the helical rib and in which the helical rib is engaged, or a helical groove in which the helical rib is engaged, the helical groove having a different lead angle from the helical rib and being arranged at the same pitch as the helical rib, thereby axially moving the carrier. Thus, the rotation of the rotary shaft is converted to a linear motion of the carrier. In this arrangement, the carrier or a linear motion member coupled to the carrier serves as an output member for linearly driving an object to be driven (JP Patent Publication 2007-32717A and JP Patent Publication 2007-37305A).

On the other hand, while many vehicle brake systems are hydraulic ones, with the recent introduction of sophisticated brake control such as anti-lock brake control system (ABS), electric brake systems are gathering attention because electric brake systems can perform such sophisticated brake control without the need for complicated hydraulic circuits. In an electric brake system, an electric motor is activated in response to a signal produced when the brake pedal is depressed, thereby pressing the braking member against the member to be braked through the above-described electric linear motion actuator, which is mounted in the caliper body (see e.g. JP Patent Publication 2003-343620A).

The electric linear motion actuator disclosed in JP Patent Publication 2007-32717A or JP Patent Publication 2007-37305A, in which the carrier or the linear motion member coupled to the carrier serves as an output member which makes a linear motion, can sufficiently increase the driving force without the need to mount a separate speed reducer and thus is compact in size. But since the carrier or the linear motion member, which undergoes a linear motion, is relatively short in the axial direction, if this electric linear motion actuator is used e.g. in an electric brake system, a tangential force applied from the member to be braked to the braking member as the object to be driven partially acts on the carrier or the linear motion member as a lateral moment. This lateral moment may hamper smooth linear motion of the carrier or the linear motion member. If a linear motion member guided by the outer race member is coupled to the brake member, as the braking member becomes worn, the axial length of the portion of the linear motion protruding from the outer race member increases while the axial length of its portion guided by the outer race member correspondingly decreases. This makes smooth linear motion of the linear motion member even more difficult.

Also, in order to stably transmit rotation of the rotary shaft as the input shaft to the respective planetary rollers, the planetary rollers are disposed between the rotary shaft and the outer race member with negative gaps, thereby applying a preload to the respective planetary rollers between the radially outer surface of the rotary shaft and the radially inner surface of the outer race member. This makes it necessary to mount the planetary rollers between the outer race member and the rotary shaft by e.g. interference fit. Also, in order to control the negative gaps for applying the preload, it is necessary to finish the radially outer surface of the rotary shaft and the radially inner surface of the outer race member with high accuracy by e.g. grinding. It is thus troublesome and time-consuming to finish the rotary shaft and outer race member and then mount the planetary rollers. This increases the manufacturing cost.

SUMMARY OF THE INVENTION

An object of the present invention is to allow smooth guidance of the linear motion of the output member even when a lateral moment acts on the output member, and to make it possible to stably transmit torque of the rotary shaft to the respective planetary rollers without applying a preload to the planetary rollers by negative gaps between the rollers and the radially outer surface of the rotary shaft and between the rollers and the radially inner surface of the outer race member.

In order to achieve this object, the present invention provides an electric linear motion actuator comprising a rotary shaft to which the rotation of a rotor shaft of an electric motor is to be transmitted, a housing having a radially inner surface, an outer race member fitted in the radially inner surface of the housing and provided around the rotary shaft, a carrier having a plurality of support pins, and a plurality of planetary rollers disposed between the outer race member and the rotary shaft and rotatably supported by the respective support pins of the carrier, wherein the planetary rollers are configured to revolve around the rotary shaft while rotating about axes of the respective planetary rollers when the rotary shaft rotates, wherein a helical rib is formed on a radially inner surface of the outer race member, and wherein each of the planetary rollers has, on a radially outer surface thereof, a plurality of circumferential grooves which are arranged at the same pitch as the helical rib and in which the helical rib is engaged, or a helical groove in which the helical rib is engaged, the helical groove having a different lead angle from the helical rib and being arranged at the same pitch as the helical rib, thereby axially moving the outer race member and the carrier relative to each other, whereby the rotary motion of the rotary shaft is converted to a linear motion of an output member, thereby driving an object to be driven coupled to the output member, wherein the axial movement of the carrier is restricted, and the outer race member is rotationally fixed and is axially slidably fitted in the radially inner surface of the housing, whereby the outer race member serves as the output member, and that the actuator further comprises an elastic member biasing the planetary rollers against a radially outer surface of the rotary shaft.

In this arrangement, since the carrier is axially immovable, and the outer race member is fitted in the housing so as to be non-rotatable but axially movable so that the outer race member serves as the output member, it is possible to guide the outer race member as the output member over its axially long area with the radially inner surface of the housing. This in turn makes it possible to smoothly guide the linear motion of the output member even when a lateral moment acts on the output member. By providing the elastic member biasing the planetary rollers against a radially outer surface of the rotary shaft, it is possible to stably transmit torque of the rotary shaft to the respective planetary rollers without applying a preload to the planetary rollers by negative gaps between the rollers and the radially outer surface of the rotary shaft and between the rollers and the radially inner surface of the outer race member.

As means for biasing the planetary rollers, the support pins may be mounted to the carrier so as to be circumferentially immovable and radially movable, and rotatably support the respective planetary rollers at a radially inner surface of each planetary roller, and the elastic member biases the respective support pins radially inwardly toward the rotary shaft.

The elastic member may be a ring-shaped elastic member enveloping the support pins so as to tend to be radially compressed.

The ring-shaped elastic member may be a radial compression spring made of spring steel and having circumferentially spaced apart ends.

Preferably, the rotary shaft is supported by a single bearing at one axial position of the rotary shaft, and the rotary shaft is indirectly supported by an annular member having an annular portion configured to be brought into contact with the radially inner surface of the outer race member when the annular portion minutely moves in a radial direction at an axial position of the rotary shaft axially spaced from the axial position of the rotary shaft where the rotary shaft is supported by the single bearing. With this arrangement, even when the planetary rollers are pressed against the radially outer surface of the rotary shaft, no moment loads acts on the bearing for the rotary shaft.

The rotary shaft may be indirectly supported by the annular member at a plurality of axial positions of the rotary shaft which are axially spaced apart from each other and from the axial position of the rotary shaft where the rotary shaft is supported by the single bearing so as to more reliably prevent moment loads from acting on the bearing for the rotary shaft.

Preferably, the annular member is brought into contact with the radially inner surface of the outer race member through a slide bearing so as to reduce friction loss when the rotary shaft rotates.

The slide bearing is preferably press-fitted on the annular member.

The present invention also provides an electric brake system comprising a member to be braked, a braking member, and an electric linear motion actuator for converting a rotary motion of an electric motor to a linear motion of the braking member, thereby pressing the braking member against the member to be braked, wherein the electric linear motion actuator is of the above-described type. With this arrangement, even when a tangential force applied from the braked member to the braking member acts on the output member as lateral moment, it is possible to smoothly guide the linear motion of the output member.

According to the present invention, since the carrier is axially immovable, the outer race member is fitted in the housing so as to be non-rotatable but axially movable so that the outer race member serves as the output member, and the elastic member is provided that presses the planetary rollers against the radially outer surface of the rotary shaft, it is possible to smoothly guide the linear motion of the output member even when a lateral moment acts on the output member, and to stably transmit torque of the rotary shaft to the respective planetary rollers without applying a preload to the planetary rollers by negative gaps between the rollers and the radially outer surface of the rotary shaft and between the rollers and the radially inner surface of the outer race member.

In the electric brake system according to the present invention, the braking member to be pressed against the braked member is driven linearly rising the above-mentioned linear motion actuator. Thus, even when a tangential force applied from the braked member to the braking member acts on the output member as a lateral moment, it is possible to smoothly guide the linear motion of the output member.

DETAILED DESCRIPTION OF THE INVENTION

Figure 1:
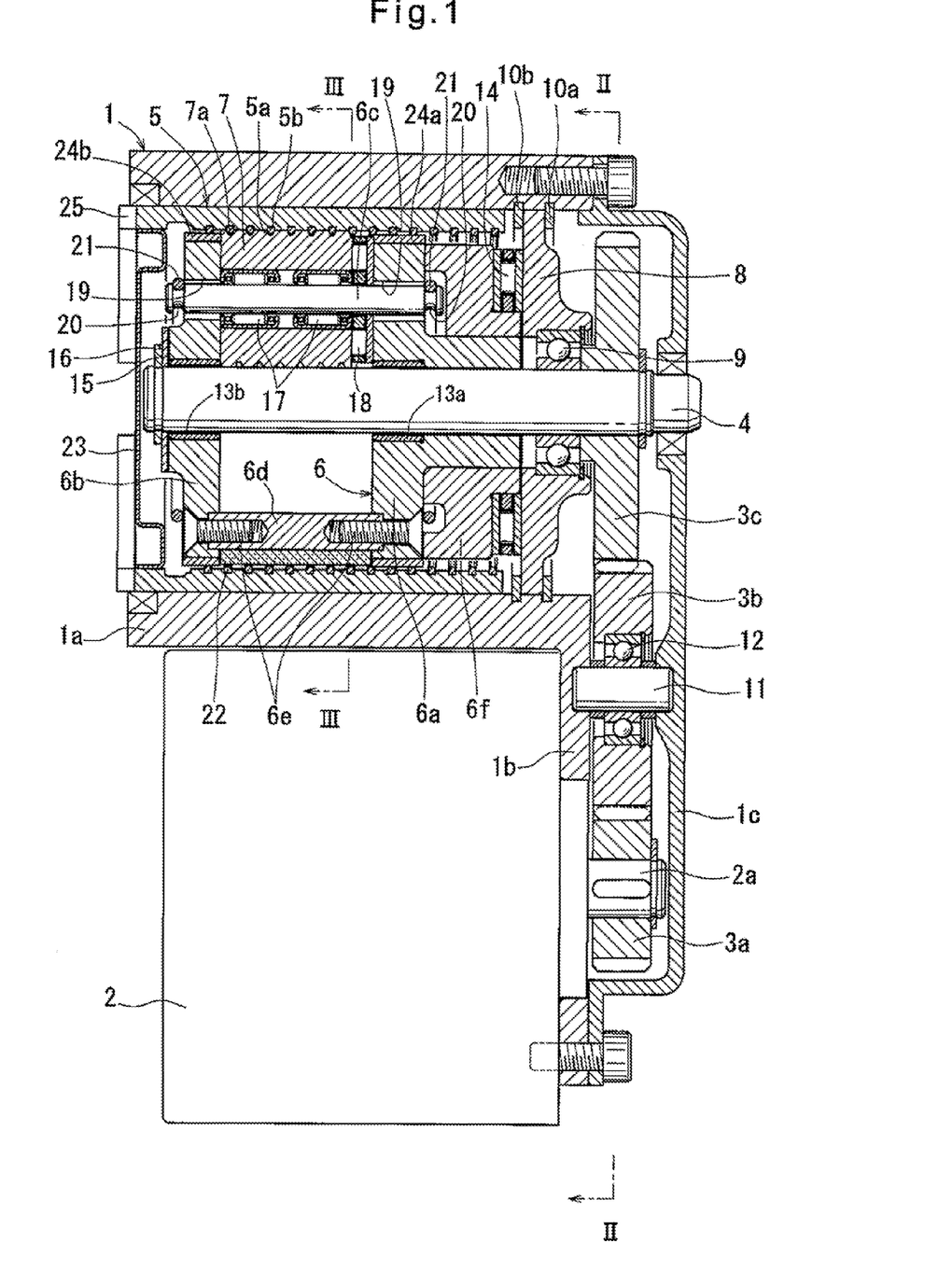
FIG. 1 is a vertical sectional view of an electric linear motion actuator embodying the present invention.
Figure 2:
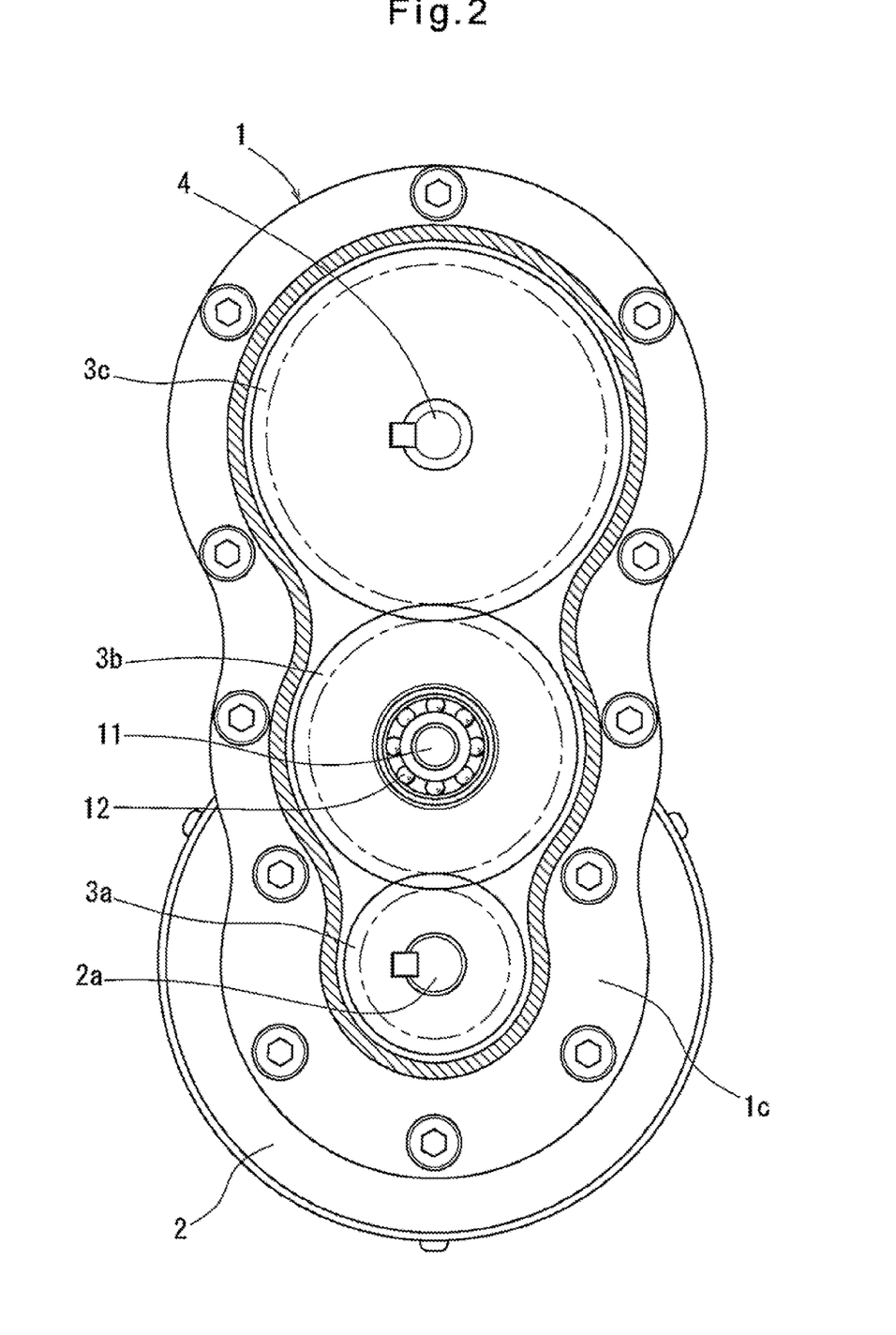
FIG. 2 is a sectional view taken along line II-II of FIG. 1.
Figure 3:
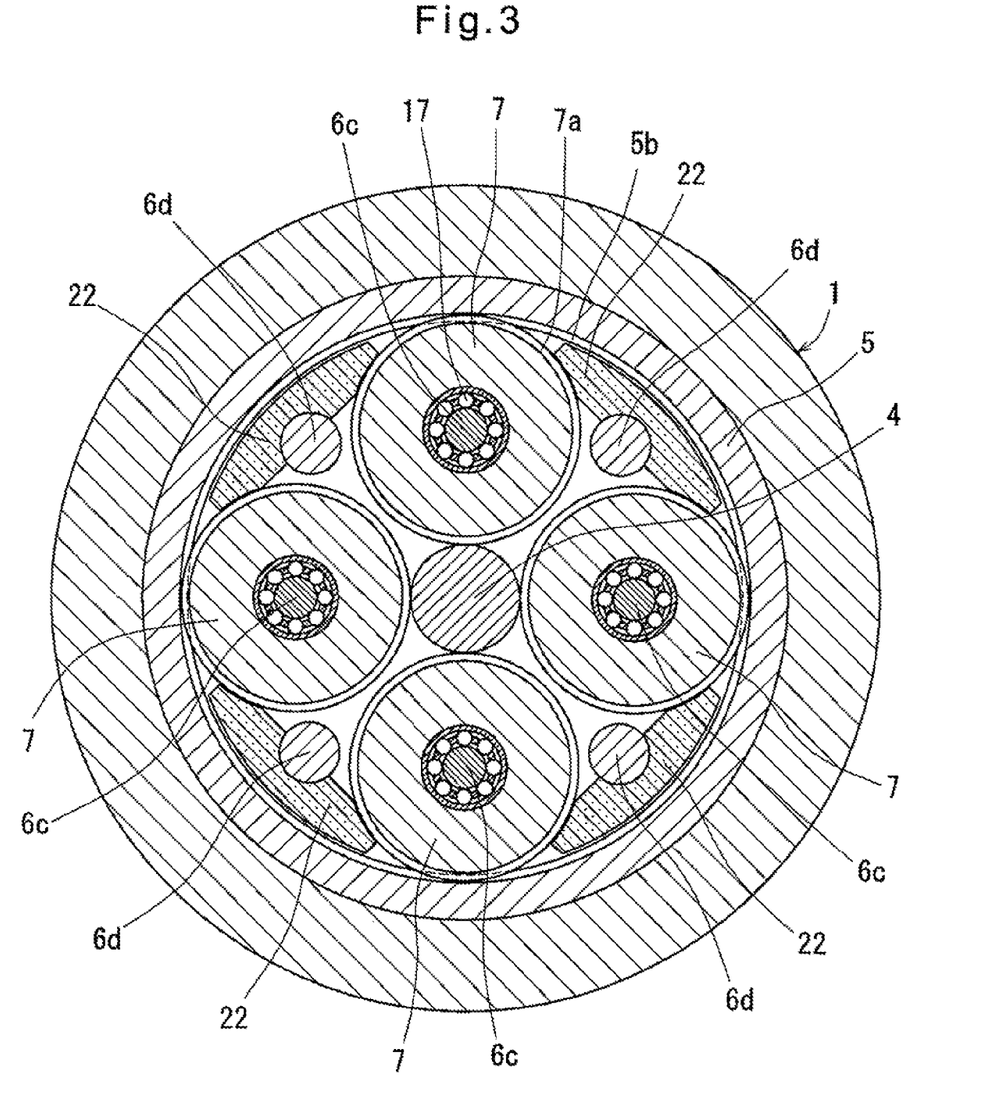
FIG. 3 is a sectional view taken along line III-III of FIG. 1.

Now the embodiment of the invention is described with reference to the drawings. As shown in FIGS. 1 to 3, the electric linear motion actuator of the embodiment includes a housing 1 having a cylindrical portion 1a and a flange 1b extending to one side from one end of the cylindrical portion 1a. An electric motor 2 is mounted to the flange 1b so as to be parallel to the cylindrical portion 1a. The electric motor 2 has a rotor shaft 2a of which the rotation is transmitted to a rotary shaft 4 extending along the axis of the cylindrical portion 1a through gears 3a, 3b and 3c. Four planetary rollers 7 are disposed between the rotary shaft 4 and an outer race member 5 axially slidably fitted in the radially inner surface of the cylindrical portion 1a. The planetary rollers 7 are rotatably supported by a carrier 6, and adapted to revolve around the rotary shaft 4 while rotating about their own axes when the rotary shaft 4 rotates.

A lid 1c is mounted to the housing 1 at its end where the flange 1b is provided. The gears 3a, 3b and 3c mesh with each other in the same plane in the closed space defined by the lid 1c. A shaft support member 8 is mounted in the cylindrical portion 1a at its end portion where the lid 1c is mounted. The rotary shaft 4 has its proximal end portion, where the gear 3c is mounted, supported by the shaft support member 8 through a ball bearing 9. The shaft support member 8 is fixed to the housing 1 by means of snap rings 10a and 10b, and serves to restrict axial movements of the rotary shaft 4 and the carrier 6 too. The intermediate gear 3b, which meshes with the gear 3a, which is mounted to the rotor shaft 2a, and the gear 3c is supported by a shaft pin 11 extending between the flange 1b and the lid 1c through a ball bearing 12.

The carrier 6 comprises a carrier body 6a and a support plate 6b which are spaced from each other and rotatably fitted around the rotary shaft 4 through slide bearings 13a and 13b, respectively, support pins 6c having their ends supported by the carrier body 6a and the support plate 6b, respectively, and rotatably supporting the respective planetary rollers 7, and a plurality of coupling rods 6d through which the support plate 6b and the carrier body 6a are coupled together so as to be angularly aligned with each other. Each coupling rod 6d has its ends coupled to the carrier body 6a and the support plate 6b by bolts 6e, respectively.

The carrier body 6a is supported on the end surface of the shaft support member 8 by means of a thrust roller bearing 14 through a support member 6f so as to be rotatable about the rotary shaft together with the planetary rollers 7. The shaft support member 8 thus restricts the movement of the carrier body 6a toward the proximal end of the rotary shaft 4. A snap ring 15 fitted on the rotary shaft 4 at its distal end prevents separation of the support plate 6b, which is coupled to the carrier body 6a through the coupling rods 6d, through a slide bearing 16 and restricts its movement toward the distal end of the rotary shaft 4. Thus, the movement of the carrier 6 toward either end of the rotary shaft 4 is restricted.

The planetary rollers 7 are rotatably supported on the respective support pins 6c of the carrier 6 through needle roller bearings 17 and are supported on the carrier body 6a through thrust roller bearings 18 so as to be rotatable about their own axes. Each support pin 6c has its ends received in radially elongated holes 19 formed in the carrier body 6a and the support plate 6b, respectively so as to be circumferentially immovable and radially movable.

Figure 4:
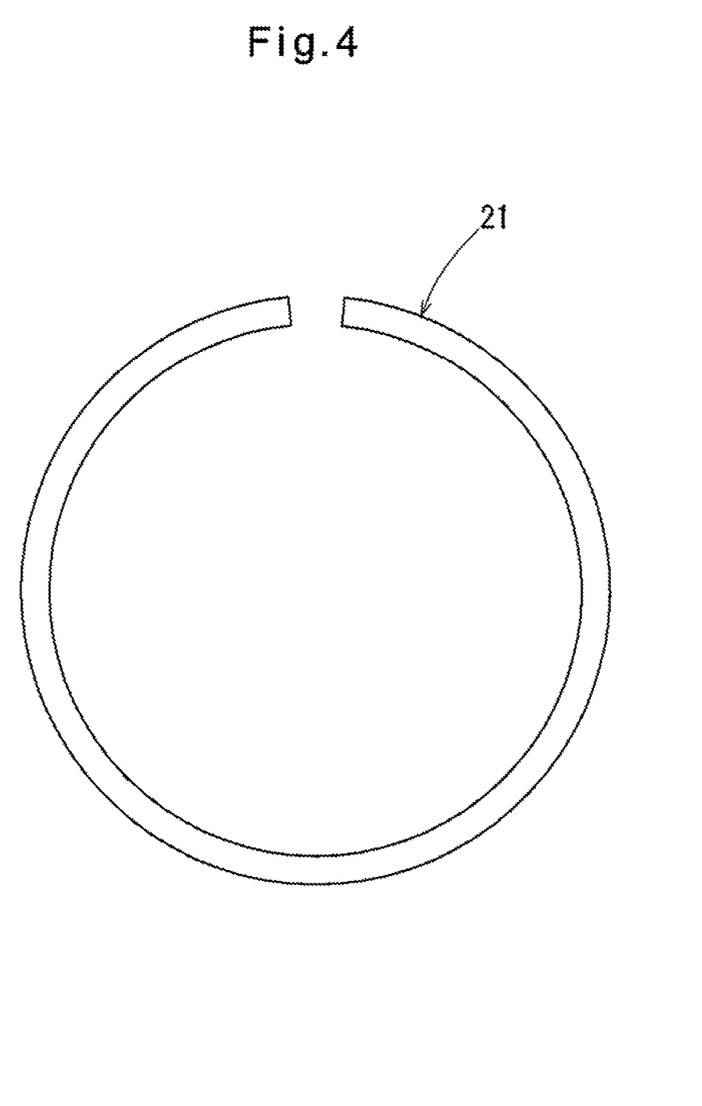
FIG. 4 is a side view of a ring-shaped radial compression spring shown in FIG. 1.

Grooves 20 are formed on the radially outer surface of each support pin 6c at the respective end portions thereof. Radial compression ring springs 21 made of spring steel and having circumferentially spaced apart ends as shown in FIG. 4 are fitted in the grooves 20 at the respective ends of the support pins 6c in a radially expanded state so as to envelop the support pins 6c. The planetary rollers 7, which are rotatably supported by the respective support pins 6c, are thus pressed against the radially outer surface of the rotary shaft 4 by the springs 21 but, as shown in FIG. 1, the planetary rollers 7 are not in threaded engagement with the rotary shaft 4. This allows stable transmission of torque of the rotary shaft 4 to the respective planetary rollers 7.

The coupling rods 6d are disposed between the respective adjacent planetary rollers 7 and couple the carrier body 6a to the support plate 6b. A fan-shaped lubricant applicator member 22 is held in position between each coupling rod 6d and the radially inner surface of the outer race member 5 which is in sliding contact with the radially outer surfaces of the planetary rollers 7 on both circumferential sides to apply grease thereto. A seal member 23 is fitted on the radially inner surface of the outer race member 5 for isolating the interior of the outer race member, in which the planetary rollers 7 and the lubricant applicator members 22 are mounted, from the outside. The seal member 23 is made by pressing a thin steel sheet and includes a cylindrical outer portion fitted in the outer race member 5.

The carrier body 6a and the support plate 6b are annular members adapted to be brought into contact with the radially inner surface of the outer race member 5 through slide bearings 24a and 24b when minutely moved in a radial direction. The carrier body 6a and the support plate 6b thus indirectly support the rotary shaft 4, thereby preventing moment loads from acting on the ball bearing 9, which supports the rotary shaft 4. The slide bearings 24a and 24b are press-fitted and fixed on the radially outer surfaces of the carrier body 6a and the support plate 6b, respectively.

An object to be driven is coupled to the distal end of the outer race member 5. The object to be drivers is rotationally fixed to the outer race member by means of keys 25 formed on the distal end surface of the outer race member. Thus, the outer race member 5, which is axially slidably fitted in the radially inner surface of the cylindrical portion 1a of the housing 1, is axially movable relative to the carrier 6, of which the movements in both axial directions are restricted relative to the housing 1, and thus serves as an output member. The end of the cylindrical portion 1a to which the object to be driven is coupled is open. Thus the outer race member 5 can undergo a linear motion with a long stroke because it can protrude from the cylindrical portion 1a. Even when the outer race member 5 protrudes from the cylindrical portion, it is guided by the radially inner surface of the cylindrical portion 1a over an axially long area, so that the outer race member can smoothly undergo a linear motion.

Figure 5A:
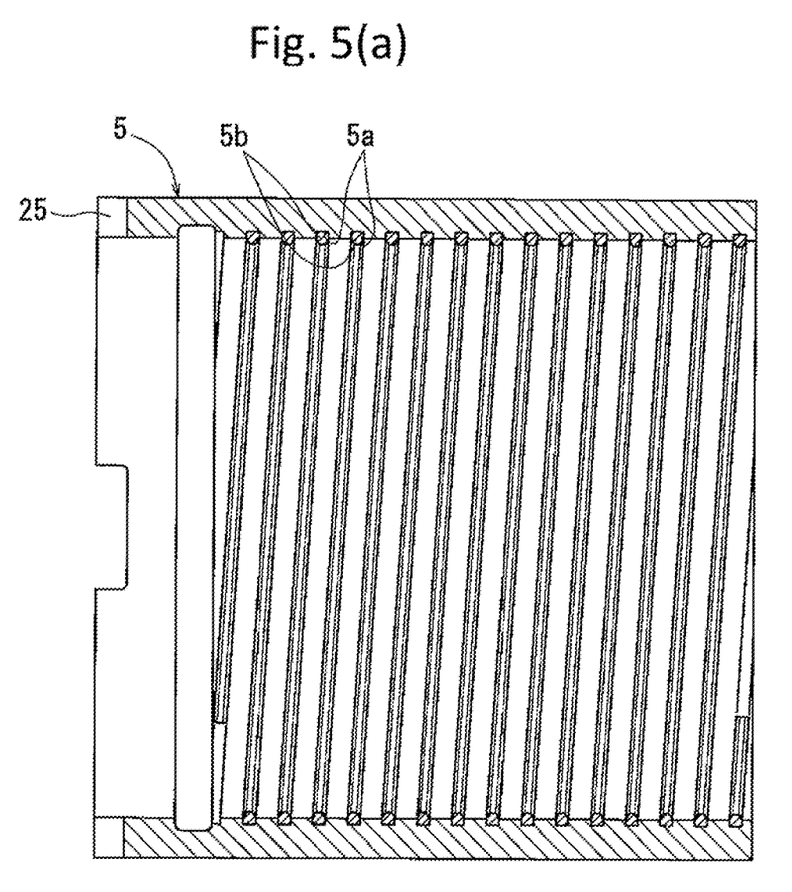
FIGS. 5(a) and 5(b) are front views showing a helical rib on the outer race member of FIG. 1 and a helical groove on a planetary roller of FIG. 1.
Figure 5B:
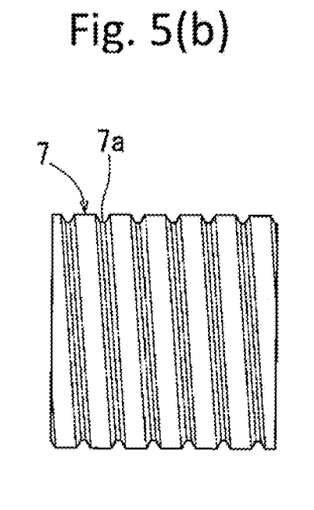

As shown in FIG. 5(a), two helical grooves 5a are formed on the radially inner surface of the outer race member 5, with which the planetary rollers 7 are brought into rolling contact. Separate rib members 5b are fixedly fitted in the respective helical grooves 5a, forming two helical ribs on the radially inner surface of the outer race member 5. As shown in FIG. 5(b), a single helical groove 7a is formed on the radially outer surface of each planetary roller 7, which is the same in pitch as and different in lead angle from the helical ribs formed by the rib members 5b, and in which the helical ribs are engaged. Due to the difference in lead angle between the helical ribs and the helical grooves 7a, when the rotary shaft 4 rotates and the planetary rollers 7 revolve around the rotary shaft 4 while rotating about their own axes, with the helical ribs engaged in the helical grooves 7a, the outer race member 5 moves axially relative to the planetary rollers 7. In the embodiment, two helical ribs are formed on the outer race member so that the difference in lead angle between the helical ribs and the helical grooves 7a of the planetary rollers 7 can be determined more freely. But a single helical rib may be formed instead. Instead of the helical groove 7a, a plurality of circumferential grooves may be formed on each planetary roller 7a at the same pitch as the helical ribs.

Figure 6:
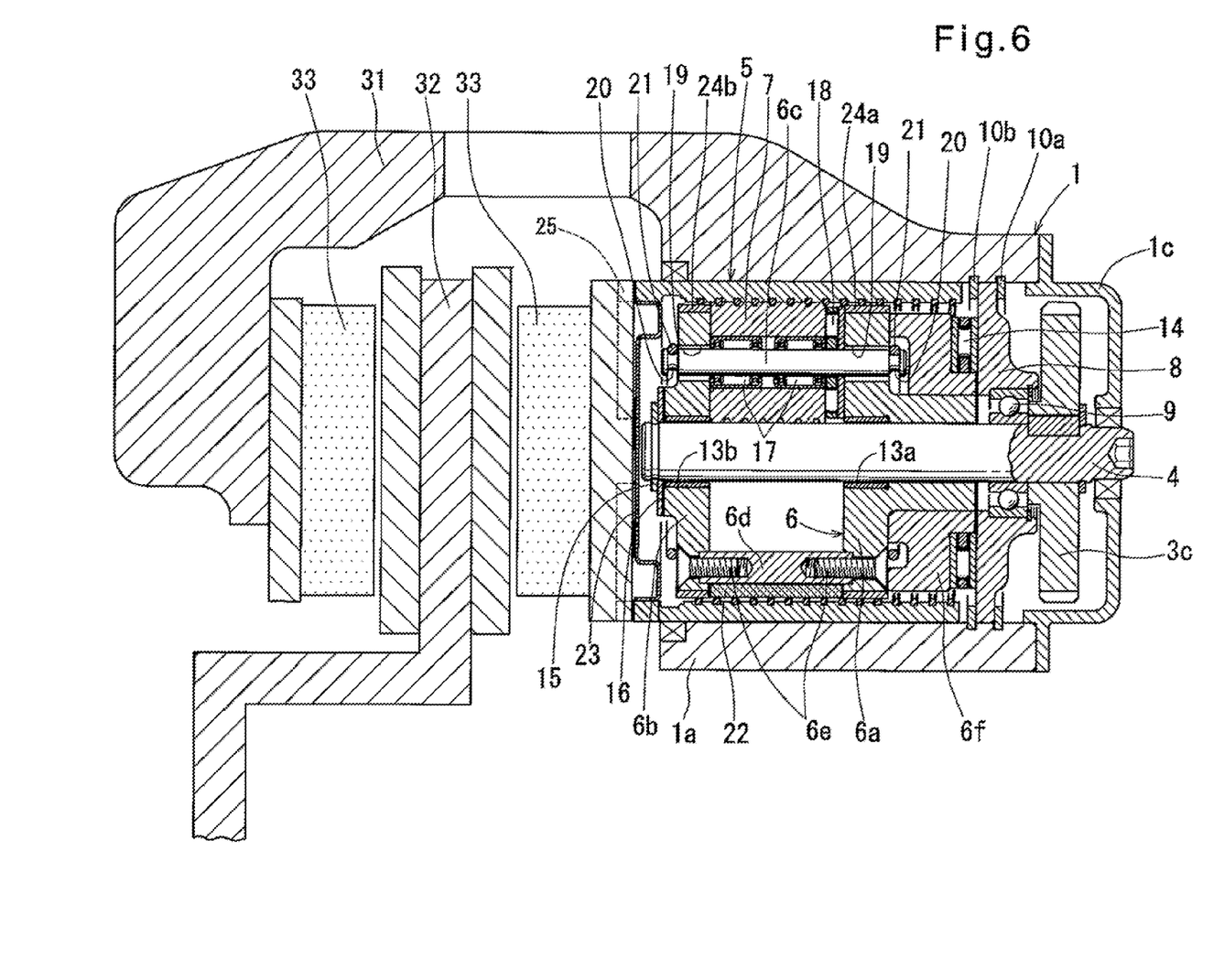
FIG. 6 is a vertical sectional view of an electric brake system using the electric linear motion actuator of FIG. 1.

FIG. 6 shows an electric brake system in which the above-described electric linear motion actuator is used. This electric brake system is a disk brake including a caliper body 31, a disk rotor 32 as a member to be braked, and brake pads 33 as braking members provided on both sides of the disk rotor 32 in the caliper body 31 so as to face each other. The housing 1 of the electric linear motion actuator is fixed to the caliper body 31, and its outer race member 5 as the output member is rotationally fixed to one of the brake pads 33 as the object to be braked through the keys 24 so that the brake pads 33 can be pressed against the disk rotor 32. In FIG. 6, the electric linear motion actuator is shown in section taken along a plane perpendicular to the plane containing the section of FIG. 1.

In the above embodiment, the helical ribs on the radially inner surface of the outer race member are formed by separate rib members fitted in the helical grooves. But instead, the helical ribs may be formed integral with the outer race member.

What is claimed is:

1. An electric linear motion actuator comprising:
   a rotary shaft (4) to which the rotation of a rotor shaft (2a) of an electric motor (2) is to be transmitted;
   a housing (1) having a radially inner surface;
   an outer race member (5) fitted in the radially inner surface of the housing and provided around the rotary shaft;
   a carrier (6) comprising a carrier body (6a and 6f) and support pins (6c) supported by the carrier body; and
   a plurality of planetary rollers (7) disposed between the outer race member and the rotary shaft and rotatably supported by the respective support pins of the carrier;
   wherein the planetary rollers are configured to revolve around the rotary shaft while rotating about axes of the respective planetary rollers when the rotary shaft rotates;
   wherein a helical rib (5b) is formed on a radially inner surface of the outer race member, and wherein each of the planetary rollers has, on a radially outer surface thereof, a plurality of circumferential grooves which are arranged at the same pitch as the helical rib and in which the helical rib is engaged, or a helical groove (5a) in which the helical rib is engaged, said helical groove having a different lead angle from the helical rib and being arranged at the same pitch as the helical rib, thereby axially moving the outer race member and the carrier relative to each other, whereby the rotary motion of the rotary shaft is converted to a linear motion of an output member in an axial direction, thereby driving an object (33) to be driven coupled to the output member;
   wherein axial movement of the carrier relative to the housing is restricted, and the outer race member is rotationally fixed and is axially slidably fitted in the radially inner surface of the housing, such that, upon rotation of the rotary shaft, the outer race member is axially moved relative to the housing and the carrier is held against axial movement relative to the housing, whereby the outer race member serves as the output member;
   wherein the planetary rollers are disposed axially between the carrier body and the object to be driven; and
   wherein the outer race member, the housing, the helical rib and the carrier body are arranged such that while an axial portion of the outer race member where the helical rib is present is entirely fitted in the radially inner surface of the housing, the radially outer surface of the carrier body is surrounded by the helical rib.

2. The electric linear motion actuator of claim 1, further comprising:
   a shaft support member (8) through which the rotary shaft is rotatably supported by the housing, and which is configured to restrict an axial movement of the outer race member in a direction away from the object to be driven; and
   a thrust rolling bearing (14) through which the carrier body is supported by the shaft support member;
   wherein the outer race member is configured to start moving axially toward the object to be driven from a position where a portion of the outer race member is radially aligned with the thrust rolling bearing, where the helical rib is engaged in portions of the respective helical grooves axially closest to the object to be driven or in one of the circumferential grooves of each of the planetary rollers which is located axially closest to the object to be driven, and where a portion of the helical rib is radially aligned with abutment surfaces of the thrust rolling bearing and the carrier body that are in abutment with each other.

3. The electric linear motion actuator of claim 1, wherein the carrier body is rotatably fitted around the rotary shaft through a slide bearing (13a), and wherein the planetary rollers are supported by the carrier body through respective thrust roller bearings (18) so as to be rotatable about their respective axes.

4. The electric linear motion actuator of claim 1, wherein the housing has an opening at an axial end thereof where the outer race member is coupled to the object to be driven, and wherein the outer race member is arranged to protrude from the housing through the opening of the housing.

5. The electric linear motion actuator of claim 1, wherein the carrier further comprises a support plate (6b) provided axially between the planetary rollers and the object to be driven and configured to prevent separation of the planetary rollers from the respective support pins, and wherein a snap ring (15) is fitted on the rotary shaft to prevent movement of the support plate and thus the carrier in one axial direction.

6. An electric brake system comprising the linear motion actuator of claim 1, a member (32) to be braked against which the object (33) to be driven is pressed when the object is driven in one axial direction.

* * * * *